United States Patent [19]

Thompson

[11] 4,038,220
[45] July 26, 1977

[54] METHOD FOR ADHESION OF RUBBER [USING N-(SUBSTITUTED OXYMETHYL)MELAMINES AND BETA NAPHTHOL] TO REINFORCING MATERIALS

[75] Inventor: Harold Godfred Thompson, Somerville, N.J.

[73] Assignee: American Cyanamid Company, Stamford, Conn.

[21] Appl. No.: 638,479

[22] Filed: Dec. 8, 1975

Related U.S. Application Data

[63] Continuation-in-part of Ser. No. 496,245, Aug. 9, 1974, abandoned.

[51] Int. Cl.$^2$ .................. C08L 7/00; C08L 9/00; C09J 3/14
[52] U.S. Cl. ................... 260/3; 152/330 R; 260/791; 428/302; 428/465; 428/492
[58] Field of Search .................. 260/3, 791; 152/330

[56] References Cited

U.S. PATENT DOCUMENTS

| | | | |
|---|---|---|---|
| 3,212,955 | 10/1965 | Kaizerman | 260/3 |
| 3,298,984 | 1/1967 | Rye | 260/3 |
| 3,518,155 | 6/1970 | Freytag et al. | 260/3 |
| 3,638,702 | 2/1972 | Endter | 260/3 |
| 3,738,948 | 6/1973 | Dunnom | 260/3 |
| 3,821,133 | 6/1974 | Doran et al. | 260/3 |
| 3,925,271 | 12/1975 | Balinth | 260/3 |
| 3,963,652 | 6/1976 | Tanimura et al. | 260/3 |
| 3,992,334 | 11/1976 | Harvey | 260/3 |

FOREIGN PATENT DOCUMENTS

| | | | |
|---|---|---|---|
| 1,049,085 | 11/1966 | United Kingdom | 260/3 |
| 1,062,527 | 3/1967 | United Kingdom | 260/3 |

*Primary Examiner*—Ronald W. Griffin
*Attorney, Agent, or Firm*—Frank M. Van Riet

[57] ABSTRACT

A vulcanizable rubber composition is provided which comprises rubber, a filler material, an N-(substituted oxymethyl)melamine and at least one of alpha or beta naphthol.

8 Claims, No Drawings

METHOD FOR ADHESION OF RUBBER [USING N-(SUBSTITUTED OXYMETHYL)MELAMINES AND BETA NAPHTHOL] TO REINFORCING MATERIALS

This application is a continuation-in-part of my copending application Ser. No. 496,245, filed Aug. 9, 1974, and now abandoned.

Generally stated the subject matter of the present invention relates to a vulcanizable rubber composition which forms a strong bond with a tire cord material.

BACKGROUND OF THE INVENTION

Many rubber articles, principally automobile tires, but also including hoses, conveyor belts, transmission belts, and the like are usually reinforced with fibers in cord form. In all such instances the fiber must be firmly bonded to the rubber. This is so whether the fiber is natural, synthetic or metallic, or whether the rubber is natural or synthetic.

The conventional practice has been to prepare the fiber by pretreatment with a rubber latex and phenol-formaldehyde condensation product, wherein the phenol is almost always resorcinol. By a mechanism not completely understood, the resin reacts with the fiber and the rubber, effecting a firm reinforcing bond.

An alternative method entails compounding a vulcanizing rubber stock composition with the components of the phenol formaldehyde condensation product. The components of the condensation product consist of a formaldehyde, or methylene, acceptor and a formaldehyde, or methylene, donor. The most commonly employed methylene acceptor is resorcinol, while the more commonly employed methylene donors are the N-(substituted oxymethyl)melamine. The effect achieved is resin formation in situ during vulcanization of the rubber, creating a bond between the fiber and rubber irrespective of whether the fiber has been pretreated. This method is particularly useful with steel cord, where pretreatment has been largely ineffective.

However, the use of resorcinol has many inherent disadvantages. One of the most frequently encountered is occasioned by the fact that resorcinol is not readily dispersed in rubber. In addition, resorcinol is toxic. The most commonly encountered side effect of its use is the dermatological reaction commonly referred to in the trade as "red hand". These difficulties are further compounded by the fact that there is a worldwide shortage of resorcinol.

In addition, an increased need in the industry for fiber reinforcing of rubber to survive high dynamic stress, such as flexing, has brought about a continuing search for other and better methods for achieving high adhesive strength.

The present invention represents the culmination of a long series of investigations, conducted largely by the inventor, directed to finding a vulcanizable rubber stock composition comprising the components of the phenol-formaldehyde condensation product which avoids the use of resorcinol as the methylene acceptor.

Accordingly, it is a primary object of the present invention to provide a vulcanizable rubber stock composition comprising the components of the phenol-formaldehyde condensation product without resorting to the use of resorcinol as a methylene acceptor.

Another object of the invention is to provide a vulcanizable rubber stock composition which provides equal or better results for the bonding of fibers to rubber.

Generally then, it is an object of the invention to provide a new and improved vulcanizable rubber stock which avoids the inherent disadvantages of employing resorcinol as the methylene acceptor, as well as providing equal or better bonding results.

Additional objects and advantages of the invention will be set forth in part in the broad description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose, as embodied and broadly described, the present invention relates to an improved vulcanizable rubber composition comprising rubber, a filler material, an N-(substituted oxymethyl)melamine together with alpha naphthol or beta naphthol, or mixtures of alpha and beta naphthol in any ratio.

It is to be understood that both the foregoing general description and the following detailed description are exemplary and explanatory and are not restrictive of the invention.

The surprising discovery of the present invention is that alpha or beta naphthol, monohydric phenols are useful as methylene acceptors in the resin forming reaction which occurs during vulcanization. This is particularly unexpected since no monohydric phenol has ever been disclosed as useful in adhesion of a textile material to rubber. In fact, the only reference applicant has found to the use of a derivative of naphthalene has been 1,5-dihydroxynaphthalene, see British Patents Nos. 1,062,527 and 1,049,085 and U.S. Pat. No. 3,518,155. Furthermore, it is generally recognized in the art that benzene substituted in the meta position with amino or hydroxyl groups, preferably the latter, give optimum results. Alpha or beta naphthol have the advantage of being more readily dispersed in the rubber, of being relatively non-toxic, and or providing bond strengths equal to or better than can be achieved in a similar system using resorcinol.

The N-(substituted oxymethyl)melamine which serves as the methylene donor when combined with the beta naphthol has the following general formula:

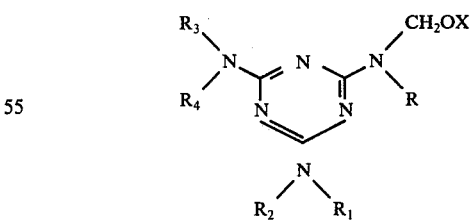

wherein X is hydrogen or lower alkyl (1–8 carbons); R, $R_1$, $R_2$, $R_3$ and $R_4$ are individually hydrogen, lower alkyl having from 1 to 8 carbon atoms or the group —CH$_2$OX, wherein X is as defined above. Specific illustrative species include hexakis(methoxymethyl)melamine, N,N',N''-trimethyl N,N',N''-trimethylolmelamine, hexamethylolmelamine, N,N',N''-trimethylolmelamine, N-methylolmelamine, N,N'-dimethylolmelamine, N,N',N''-tris(methoxymethyl)melamine, and N,N',N''-tributyl-N,N'',N''-trimethylolmelamine. A preferred methylene donor is hexakis(methoxymethyl)melamine.

The N-methylol derivatives of melamine are prepared by known methods by reacting melamine with 1 to 6 molar equivalents of formaldehyde. Although N-(substituted oxymethyl)melamines are the preferred methylene donors, others such as hexamethylenetetramine, N-(substituted oxymethyl)ureas, N-(substituted oxymethyl)imidazolidines, N-(substituted oxymethyl)hydantoins may also be useful.

Any textile material normally used to reinforce rubber may be used with the vulcanizable compositions of this invention, including cotton, rayon, polyamides, and polyester fibers. A particularly useful reinforcing material found to form strong adhesive bonds to rubber in accordance with the invention is steel or brass-plated steel wire.

The rubber being bonded to the reinforcing material may be any rubber used in the manufacture of automobile tires, drive belts, conveyor belts or pressure hose. These include natural rubber; synthetic diene rubbers, such as polybutadiene or polyisoprene; ethylene-propylene terpolymer rubbers (EPDM); butadiene, styrene copolymer rubbers (SBR); butadiene acrylonitrile copolymer rubbers (NBR); chloroprene rubber, or chlorosulfonated polyethylene, or mixtures thereof.

The rubber vulcanizate which is bonded to the textile fiber or steel wire by in situ resin formation will contain conventional compounding ingredients such as carbon black, antioxidants, sulfur, zinc oxide, accelerators, high surface area activated silica (including mixtures thereof with carbon black), processing and softening oils, and the like.

The N-(substituted oxymethyl)melamines are incorporated into the rubber vulcanizate in an amount of from about 1 to 10 parts per hundred parts of rubber, preferably about 2 to 4 parts per hundred parts of rubber. The alpha or beta naphthol is incorporated into the rubber vulcanizate in an amount of from about 0.5 to 8 parts per hundred parts of rubber, preferably 1 to 3 parts per hundred parts of rubber.

For optimum adhesion of the steel cords to rubber it has been found to be desirable to incorporate a high surface area activated silica into the vulcanizable composition. When used, silica is added in an amount of from about 2 to 14 parts per hundred parts of rubber, preferably 8 to 12 parts per hundred parts of rubber.

A preferred method of making the rubber vulcanizate is to mix the rubber, carbon black, zinc oxide, lubricants, alpha or beta naphthol, and the like, in a Banbury mixer at a temperature of about 300° F. The resulting masterbatch is then compounded on a standard 2-roll rubber mill with sulfur accelerators, silica, and formaldehyde precursor. The vulcanizable composition is shaped, placed in contact with 15 steel cords or wires, placed parallel, and vulcanized.

α-Naphthol and β-naphthol, or mixtures thereof, may also be used effectively to promote adhesion of tire cords to rubber by the well known tire cord dip treatment metod, whereby a latex, such as styrene/butadiene (SBR) or a styrene/butadiene/vinyl pyridine latex, depending on the particular textile fiber used, is blended with either α-naphthol or β-naphthol, or mixtures thereof, and a N-(substituted oxymethyl)melamine, and the latex blend used to coat the tire cord material. The thus treated tire cord may then be vulcanized in contact with a conventional rubber stock composition to provide excellent adhesion of the cords to rubber. The amount of α- or β-naphthol used in such application may be an amount equivalent to the amount of resorcinol conventionally used in tire cord dipping processes, known in the art as the RFL method.

Adhesion is measured using ASTM D-2229 modified by pulling seven alternating wires while holding the sample by two adjacent wires protruding from the opposite side of the sample, thereby reducing the effect of the rubber modulus on the adhesion values.

The following examples are provided for illustrative purposes and may include particular features of the invention. However, the examples should not be construed as limiting the invention, many variations of which are possible without departing from the spirit or scope thereof.

EXAMPLE I

Masterbatches consisting of 150 parts by weight and containing 100 parts by weight of rubber and 1 part by weight of resorcinol or beta naphthol were prepared as follows, using a Banbury mixer at 300° F

| MASTERBATCH COMPOSITIONS | | | |
|---|---|---|---|
| | Parts by weight | | |
| | A | B | C |
| Natural rubber (SMR-5L) | 52 | 52 | 52 |
| Polybutadiene | 18 | 18 | 18 |
| SBR 1500 | 30 | 30 | 30 |
| Carbon black | 40 | 40 | 40 |
| Zinc Oxide | 5 | 5 | 5 |
| Stearic acid | 2 | 2 | 2 |
| Cyanoflex$^R$ 50 (a) | 2 | 2 | 2 |
| Resorcinol | 1 | — | — |
| Beta naphthol | — | 1 | — |
| | 150 | 150 | 149 |

(a) Reaction product of diphenylamine and acetone; 50 percent by weight on carbon black The above masterbatches were then compounded on a standard rubber mill at 50° F for 5 minutes as follows:

| PREVULCANIZATE COMPOSITIONS | | | |
|---|---|---|---|
| | Parts by Weight | | |
| | A | B | C |
| Masterbatch | 150 | 150 | 149 |
| Sulfur | 2.4 | 2.4 | 2.4 |
| N-oxydiethylene benzotriazole-2-sulfenamide | 1.3 | 1.3 | 1.3 |
| Activated Silica (Hi-Sil EP) | 10.0 | 10.0 | — |
| Hexakis(methoxymethyl)melamine | 3.0 | 3.0 | — |

The compositions were embedded with 15 clean, brass plated steel wires, placed parallel, and the compositions vulcanized for 24 minutes at 307° F.

Adhesion, as measured in accordance with the aforementioned ASTM method (modified) gave the following results (adhesion in pounds per linear inch, pli).

| ADHESION EVALUATION | | | |
|---|---|---|---|
| (7 Specimens tested per composition) | | | |
| Adhesion Values - 7 specimens | A | B | C |
| | 96 | 96 | 45 |
| | 116 | 99 | 59 |
| | 90 | 96 | 52 |
| | 116 | 99 | 47 |
| | 89 | 109 | 43 |
| | 110 | 143 | 64 |
| | 82 | 123 | 47 |
| Average of 7, adhesion, pli | 100 | 109 | 51 |

| ADHESION EVALUATION | | | |
|---|---|---|---|
| (7 Specimens tested per composition) | | | |
| Adhesion Values --7 specimens | A | B | C |
|  | 200 | 218 | 102 |

The above data illustrate that beta naphthol, a monohydric phenol, provided adhesion values about 10 percent better than resorcinol.

EXAMPLE II

Following the procedure described in Example I using 2 parts of α-naphthol instead of one part β-naphthol, the following data was obtained:

| MASTERBATCH COMPOSITIONS | | | |
|---|---|---|---|
| Parts by weight | | | |
|  | A | B | C |
| Natural Rubber (SMR-5L) | 52 | 52 | 52 |
| Polybutadiene | 18 | 18 | 18 |
| SBR 1500 | 30 | 30 | 30 |
| Carbon Black | 40 | 40 | 40 |
| Zinc Oxide | 5 | 5 | 5 |
| Stearic Acid | 2 | 2 | 2 |
| Cyanaflex* 50 | 2 | 2 | 2 |
| Resorcinol | 2 | — | — |
| Alphanaphthol | — | 2 | — |

| PREVULCANIZATE COMPOSITIONS | | | |
|---|---|---|---|
| Masterbatch | 151.0 | 151.0 | 149.0 |
| Sulfur | 2.4 | 2.4 | 2.4 |
| N-oxydiethylenebenzothiazole--2-sulfenamide | 1.3 | 1.3 | 1.3 |
| Activated Silica (Hi-Sil EP) | 10.0 | 10.0 | — |
| hexakis(methoxymethyl)melamine | 3.0 | 3.0 | — |

| ADHESION EVALUATION | | | |
|---|---|---|---|
| (Avg. of seven evaluations) | | | |
| Adhesion, pli | 218 | 244 | 100 |

*Registered Trademark

EXAMPLE III

A prevulcanizate composition was prepared as in Example I, embedded with nylon cords and vulcanized in the same manner. The adhesion results were comparable to those of Example 1.

EXAMPLE IV

A prevulcanizate composition was prepared as in Example II, embedded with rayon cords and vulcanized in the same manner. The adhesion results were similar to those of Example II.

What is claimed:

1. A vulcanizable rubber composition comprising rubber, a vulcanizing agent, from about 1 to 10 parts per 100 parts of the rubber of an N-(substituted oxymethyl)-melamine having the following general formula

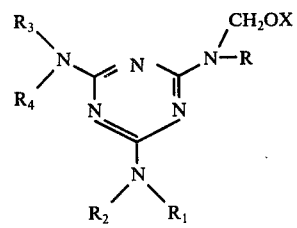

wherein X is hydrogen or lower alkyl having 1 to 8 carbon atoms; R, $R_1$, $R_2$, $R_3$ and $R_4$ are individually hydrogen, lower alkyl having from 1 to 8 carbon atoms or the group —CH$_2$OX, wherein X is as defined above, and from about 0.5 to 8 parts per 100 parts of rubber of at least one of alpha or beta naphthol, said rubber composition when vulcanized, having good adhesion to textile fiber or metal reinforcing cords embedded therein.

2. The composition according to claim 1 wherein the melamine is hexakis(methoxymethyl)melamine.

3. The composition according to claim 1 wherein the concentration of N-(substituted oxymethyl)melamine is from about 2 to 4 parts per hundred parts of the rubber.

4. The composition according to claim 1 wherein the concentration of alpha or beta naphthol is from about 1 to 3 parts per hundred parts of the rubber.

5. The composition according to claim 1 wherein the rubber is selected from the group consisting of natural rubber, polybutadiene, polyisoprene, polychloroprene, butadiene/styrene copolymer rubbers, butadiene/acrylonitrile copolymer rubbers, ethylene-propylene terpolymer rubbers and blends thereof.

6. A vulcanized rubber article reinforced with a textile fiber or wire cord and prepared from the vulcanizable rubber composition of claim 1.

7. The composition according to claim 1 containing, in addition thereto, 2 to 14 parts of high surface area activated silica per hundred parts of the rubber.

8. The composition according to claim 1, containing in addition thereto, carbon black.

* * * * *